United States Patent
Baker

(10) Patent No.: US 10,239,565 B2
(45) Date of Patent: Mar. 26, 2019

(54) PICKUP TRUCK TAILGATE LIFTING APPARATUS

(71) Applicant: John Michael Baker, Andrews, IN (US)

(72) Inventor: John Michael Baker, Andrews, IN (US)

( * ) Notice: Subject to any disclaimer, the term of this patent is extended or adjusted under 35 U.S.C. 154(b) by 56 days.

(21) Appl. No.: 15/211,089

(22) Filed: Jul. 15, 2016

(65) Prior Publication Data

US 2017/0015367 A1    Jan. 19, 2017

Related U.S. Application Data

(60) Provisional application No. 62/193,799, filed on Jul. 17, 2015.

(51) Int. Cl.
*B60J 5/12* (2006.01)
*B62D 33/027* (2006.01)
*B62D 33/037* (2006.01)

(52) U.S. Cl.
CPC .......... *B62D 33/0273* (2013.01); *B60J 5/125* (2013.01); *B62D 33/037* (2013.01)

(58) Field of Classification Search
CPC ..... B60J 5/125; B62D 33/0273; B62D 33/037
USPC .................................................. 296/56, 57.1
See application file for complete search history.

(56) References Cited

U.S. PATENT DOCUMENTS

| | | | | |
|---|---|---|---|---|
| 4,585,265 A * | 4/1986 | Mader | ............... | B62D 33/0273 296/180.1 |
| 5,234,249 A * | 8/1993 | Dorrell | ............. | B62D 33/0273 296/180.1 |
| 6,179,361 B1 * | 1/2001 | Sailors | ..................... | B60P 1/26 296/180.1 |
| 6,196,609 B1 * | 3/2001 | Bowers | .................... | B60P 1/26 296/57.1 |
| 6,224,138 B1 * | 5/2001 | Adsit | ...................... | B60J 7/041 224/404 |
| 6,315,346 B1 * | 11/2001 | Martin | ..................... | B60P 3/40 296/50 |
| 6,390,527 B1 * | 5/2002 | Leftridge | ................. | B60J 7/041 296/37.6 |
| 6,827,386 B2 * | 12/2004 | Stevenson | .......... | B62D 33/0273 296/51 |
| 6,955,390 B2 * | 10/2005 | Rigorth | ................... | E05F 15/63 296/146.4 |
| 7,357,435 B2 * | 4/2008 | Robertson | .......... | B60R 25/1001 296/146.4 |
| 7,422,262 B2 * | 9/2008 | Marshall | ............ | B62D 33/0273 296/57.1 |

(Continued)

FOREIGN PATENT DOCUMENTS

WO    WO-2007082091 A2 *  7/2007   ............. E04H 4/082

*Primary Examiner* — Pinel E Romain
(74) *Attorney, Agent, or Firm* — Greg N. Geiser; Gutwein Law

(57) ABSTRACT

A pickup truck tailgate lifting system and apparatus. The system in communication with the tailgate of the truck and located within an interior of the truck bed. The apparatus comprising a motor, a sprocket, a chain, and pins located on opposed ends of the tailgate, wherein the chain engages the tailgate and moves the tailgate from a closed position to an open position. The pins of the apparatus allow for normal operation of the tailgate during non-use of the apparatus.

11 Claims, 6 Drawing Sheets

(56) References Cited

U.S. PATENT DOCUMENTS

| | | | | |
|---|---|---|---|---|
| 7,673,927 B2* | 3/2010 | Brockhoff | ................ | B60J 5/105 |
| | | | | 296/146.11 |
| 7,695,043 B2* | 4/2010 | Zagoroff | ................ | B62D 33/03 |
| | | | | 296/50 |
| 7,874,610 B2* | 1/2011 | Khalighi | .............. | B62D 35/007 |
| | | | | 296/180.1 |
| 8,075,035 B1* | 12/2011 | Sullivan | .................. | B60J 7/041 |
| | | | | 296/100.03 |
| 8,100,615 B1* | 1/2012 | Freeborn | .................. | B60P 7/14 |
| | | | | 410/130 |
| 8,532,873 B1* | 9/2013 | Bambenek | ........... | B62D 33/037 |
| | | | | 296/26.04 |
| 8,556,322 B2* | 10/2013 | Babbage | ................ | B60J 7/1628 |
| | | | | 296/146.8 |
| 9,499,032 B2* | 11/2016 | Ikeda | ...................... | B60J 5/101 |
| 9,637,967 B2* | 5/2017 | Hunt | ..................... | E05F 15/627 |
| 9,731,584 B2* | 8/2017 | Hannan | .................... | B60J 7/068 |
| 2016/0046332 A1* | 2/2016 | Mantchev | .......... | B62D 33/0273 |
| | | | | 296/51 |
| 2017/0050579 A1* | 2/2017 | Ranka | ..................... | B60R 11/06 |

* cited by examiner

PICKUP TRUCK TAILGATE LIFTING APPARATUS

CROSS REFERENCE TO RELATED APPLICATIONS

This application claims priority to U.S. Provisional Patent Application No. 62/193,799 filed 17 Jul. 2015 to the above named inventor, and is herein incorporated by reference in its entirety.

FIELD OF THE INVENTION

The invention relates generally to a pickup truck tailgate lifting system and apparatus.

BACKGROUND

Currently there are a number of solutions for loading and unloading a pickup truck. Some of these solutions attempt to unload in the traditional manner by lowering the tailgate and reaching in, but these solutions fail to meet the needs of the market because the suspension which makes a truck ride higher in the back makes accessibility into the truck beds is difficult. Other solutions attempt to have a person jump into the truck bed and unload that way, but these solutions are similarly unable to meet the needs of the market because this doesn't work for older people or people with disabilities.

SUMMARY OF THE INVENTION

It would be advantageous to have an apparatus that lifts the tailgate of a truck out of the way for access to cargo. Furthermore, it would also be advantageous to have an apparatus that is an electric motor with a chain/sprocket system that pulls and pushes the tailgate into the up position then back to the down position. Still further, it would be advantageous to have an apparatus connects to the top pins of the truck that the tailgate is latched to. Therefore, there currently exists a need in the market for an apparatus that is in communication with the various connection points and latches of a tailgate through engagement with a movable chain coupled the motor and engaged with a sprocket.

The motor and sprocket are positioned approximately half way between the vehicle cab and bed opening on opposed sides of an upper portion bed. The chain of the device traveling within a channel, the channel sized and configured to receive a pair of pins on each side of the tailgate. These four (4) pins traveling within the channel as the chain, sprocket, and motor pulls the tailgate into an upward position and push the tailgate into a downward position.

The invention advantageously fills the aforementioned deficiencies by providing a pickup truck tailgate lifting system and apparatus, which provides easier access to cargo in the bed of a pickup truck.

The invention is an electric motor with a chain/sprocket system that pulls and pushes the tailgate into the up position then back and into the down position. When not it in use, the device allows the four major pins of the truck/tailgate system to be in there original and normal positions allowing the tailgate to function normally when not using the lift system.

The apparatus has a motorized pulley system to pull the tailgate upwards and flat between the bed rails of the truck.

The apparatus allows for a quick release of the tailgate pins.

The apparatus fulfills the need for easier access to cargo in the back of a pickup truck.

Among other things, it is an advantage of the invention to provide a pickup truck tailgate lifting system and apparatus that does not suffer from any of the problems or deficiencies associated with prior solutions.

It is still further an advantage of the invention to be activated remotely or by a mounted switch.

Still further, the apparatus can be equipped with a pressure switch or electric eye to prevent property damage.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
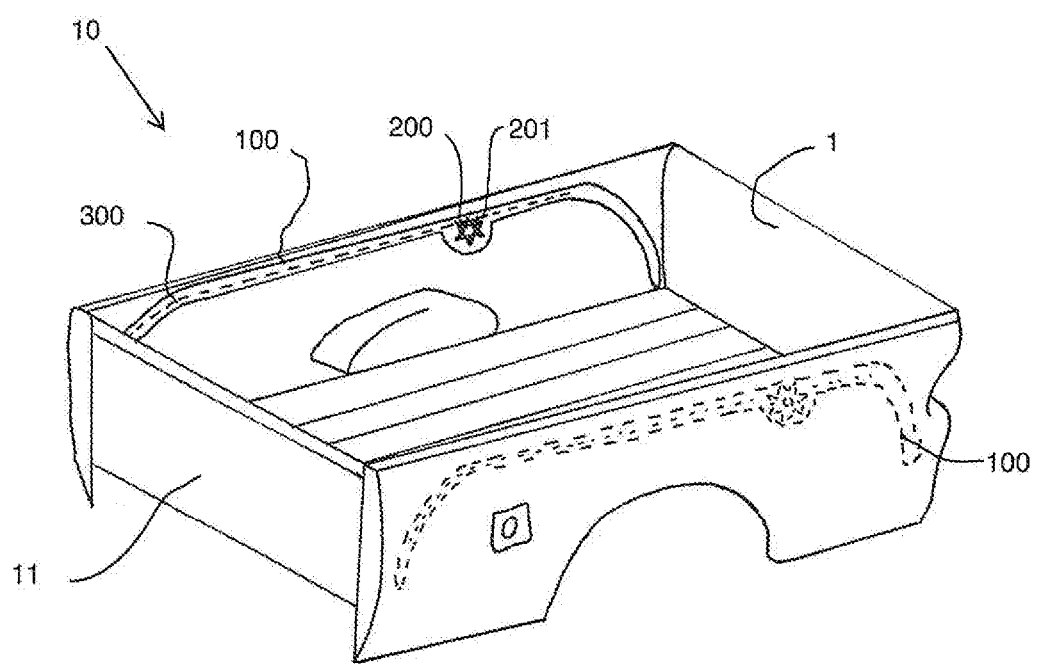
FIG. 1 shows a perspective view of the of the device with the tailgate closed, according to the present invention.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus.

These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention is directed to be a pickup truck tailgate lifting system and apparatus.

Figure 2:
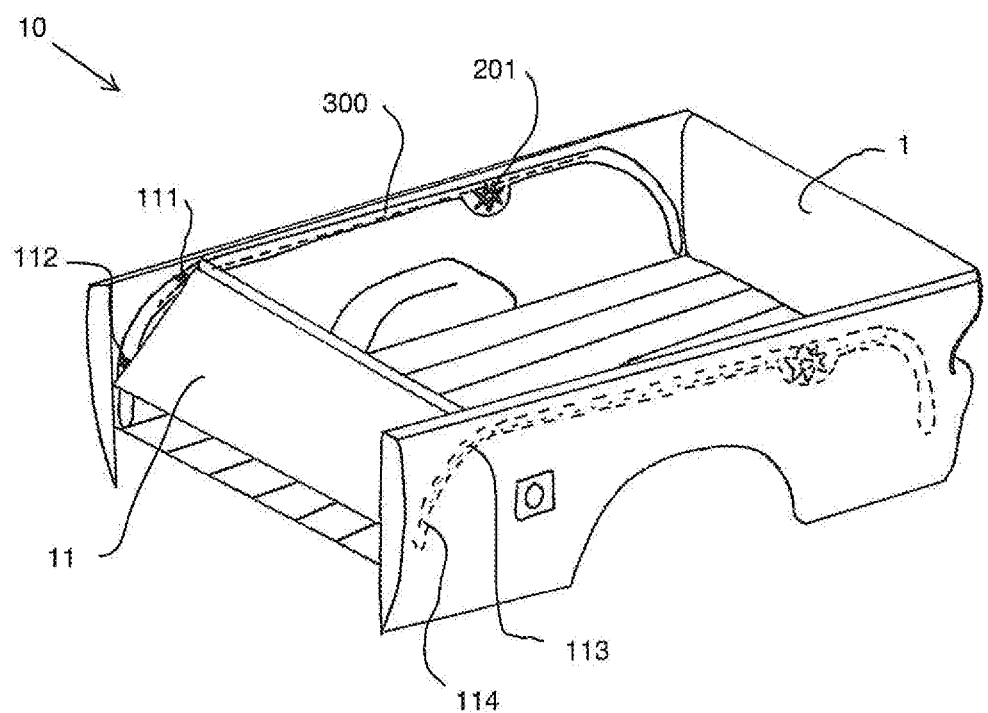
FIG. 2 shows a perspective view of the of the device with the tailgate partially open, according to the present invention.
Figure 3:
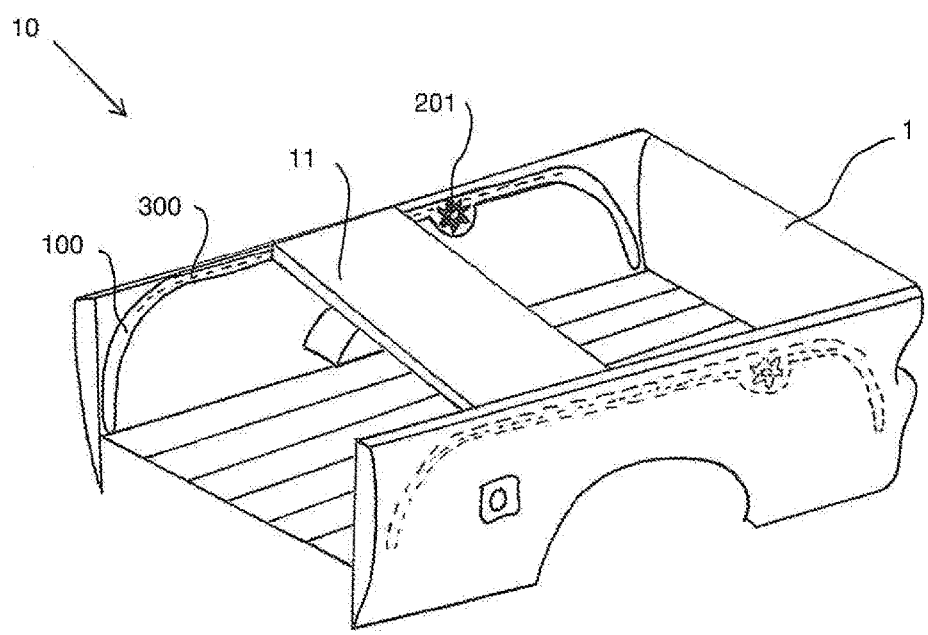
FIG. 3 shows a perspective view of the of the device with the tailgate open, according to the present invention.
Figure 4:
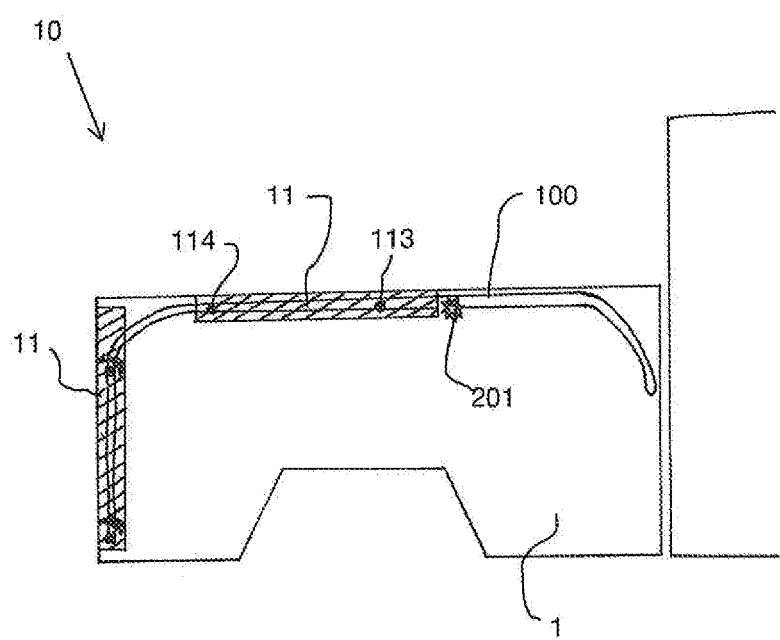
FIG. 4 shows a side view of the device with the tailgate in the open and closed position, according to the present invention.
Figure 5:
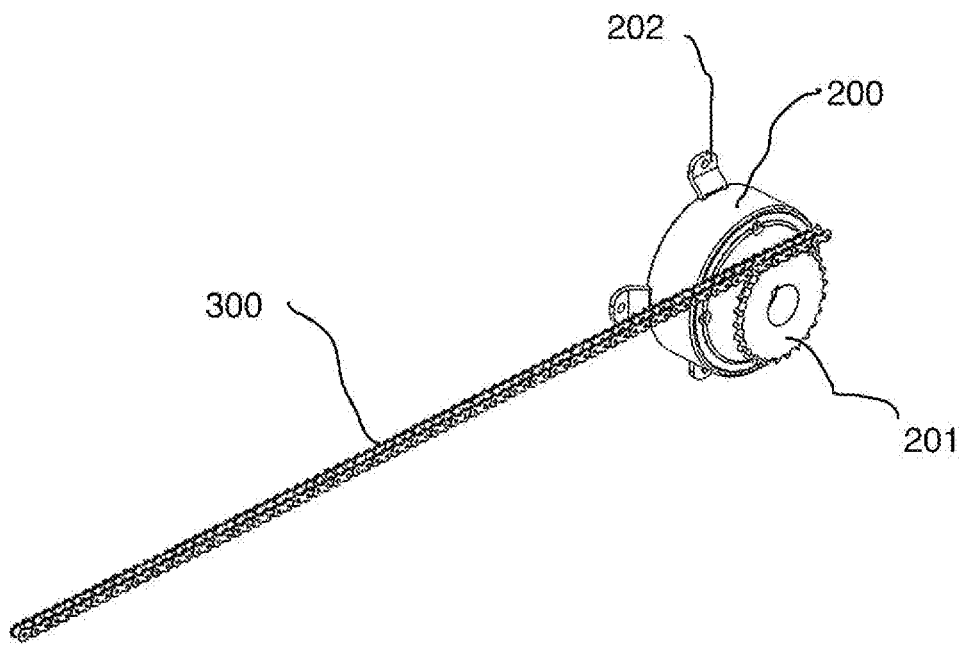
FIG. 5 shows a perspective view of the motor, sprocket, and chain assembly, according to the present invention.
Figure 6:
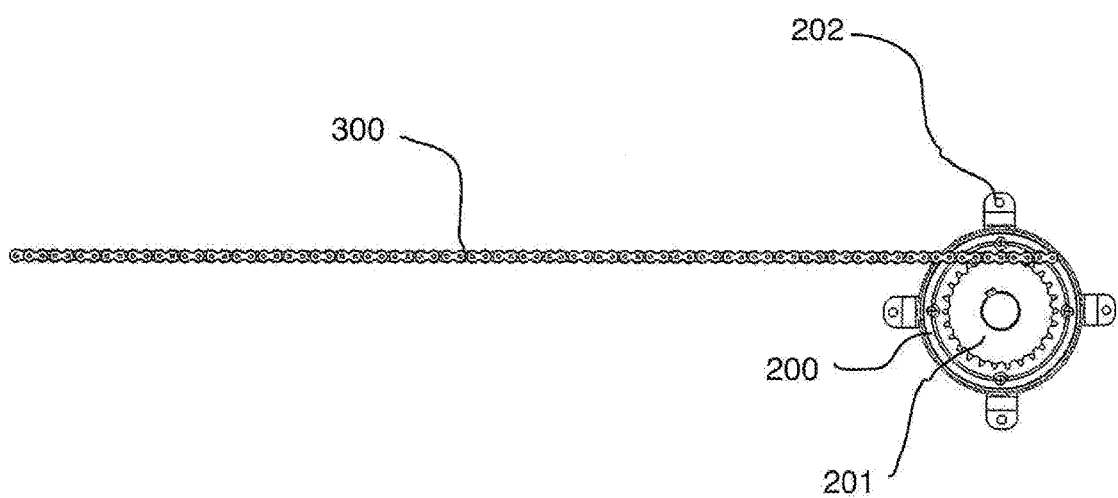
FIG. 6 shows a side view of the motor, sprocket, and chain assembly, according to the present invention.

Referring to the figures, FIG. 1-6 show the tailgate lifting system of the present invention, generally referred to as device 10. The device 10 is designed for placement within the interior portion of a truck bed 1 along the upper portion of the bed rails 2. Preferably, the device 10 is adaptable for aftermarket installation or capable as an add-on feature within new vehicles. The device 10 generally comprises a channel portion 100, a motor portion 200, a sprocket 201 coupled to the motor portion 200, and a chain 300 in communication with the sprocket 201 and in communication with a tailgate 11 of the vehicle. This composition is provided in duplicate with the configuration provided on each side of the truck bed 1 interior and in communication with each of the sides of the tailgate 11. The tailgate 11 including pins 111-114 located on its upper and lower sides for engagement with both the truck body and the track portion, wherein the pins 111-114 are received within the channel 100 and engaged to the chain 300 for movement of the tailgate 11 into an open position and a closed position.

When the apparatus 10 is not in use, the tailgate 11 functions normally and hingedly with the lower pins 112, 114 received within the body and frame of the truck bed 1. The pins 111-114 are in communication with the apparatus 10 wherein operation of the motors 200 disengages the pins 111-114 allowing for movement of the tailgate 11 along the channel 100.

The motor 200 is provided in duplicate and mounted within the interior side of a truck bed 1 near the upper portion of the truck bed adjacent to the bed rails. The motors 200 are preferably electric an in coupled communication for simultaneous operation. The motor 200 may include mounting tabs 202 to aid in mounting the motor 200 within the bed 1. The motor 200 may also be provided as a feature within a new or existing vehicle and installed internally.

The motor 200 includes a sprocket 201 having geared teeth in communication with the chain 300. The chain 300 moving along the sprocket 201 during operation of the device 10. The chain 300 having an end opposite the sprocket 201. The end coupled to the tailgate 11 upper pins 111, 113, wherein movement of the motor 200 turns the sprocket 201, moves the chain 300 and opens or closes the tailgate 11. The tailgate 11 is pulled to an open position that spans the truck bed underneath the truck bed rails.

The tailgate 11 of the attached system travels within the channel 100 affixed to the interior of the truck bed 1. The pins 111-114 of the tailgate will engage within this channel 100 during movement of the motors 200 and sprockets 201. Accordingly, the tailgate 11 is capable of normal operation or powered operation via the device 10. The motor 200 can be installed as after market accessory and operated via remote or a switch mounted to the truck bed 1.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A powered lift gate apparatus for placement in a truck bed to move a tailgate, the apparatus comprising:
   a pair of motors, each motor of the pair of motors positioned at a central location in the truck bed on an interior opposed side adjacent to an upper portion of the truck bed, wherein the motors are capable of simultaneous rotary motion;
   a pair of sprockets, each of the sprockets of the pair of the sprockets coupled to the motor, the sprockets including a plurality of teeth, the sprockets rotating in cooperation with the motor; and
   a pair of chains, each of the chains of the pair of chains in communication with the sprocket and coupled to tailgate, wherein operation of the motor displaces the chain and moves the tailgate to an open position or a closed position.

2. The powered lift gate apparatus as in claim 1, wherein the central location is a position equidistant between a cab of the truck and the tailgate.

3. The powered lift gate apparatus as in claim 1, wherein the tailgate includes pins, the pins located at opposed edges of the tailgate and designed for engagement with the chain and the truck body.

4. The powered lift gate apparatus as in claim 3, wherein the pins are movable from an engaged position to a disengaged position, wherein the disengaged position allows the tailgate to be movable from the open position to the closed position.

5. A powered lift gate apparatus for placement in a truck bed to move a tailgate, the apparatus comprising:
   the tailgate hingedly mounted at an end of the truck bed opposite a cab of the truck in an engaged position, the tailgate having opposed ends in communication with an upper side and a lower side, the opposed ends each including a pair of pins, a pin of the pair of pins located on the upper side and a pin of the pair of pins located on the lower side;
   a pair of motors, each motor of the pair of motors centrally positioned in the truck bed on an interior opposed side adjacent to an upper portion of the truck bed, wherein the motors are capable of simultaneous rotary motion;
   a pair of sprockets, each of the sprockets of the pair of the sprockets coupled to the motor, the sprockets including a plurality of teeth, the sprockets rotating in cooperation with the motor; and
   a pair of chains, each of the chains of the pair of chains in communication with the sprocket and coupled to the pins on the upper side of the tailgate, wherein operation of the motor displaces the chain and moves the tailgate to and from the engaged position.

6. The powered lift gate apparatus as in claim 5, wherein the motor position is equidistant between the cab of the truck and the tailgate.

7. The powered lift gate apparatus as in claim 5, wherein the apparatus includes a pair of channels, each channel of the pair of channels being recessed relative to an internal frame of the interior of the truck bed, the channel receiving the chain and the pins and adjacent to the motor, the channel extending a substantial portion of a length of the truck bed, wherein the channel partially conceals the apparatus during use.

8. The powered lift gate apparatus as in claim 5, wherein the apparatus includes a locking mechanism, the locking mechanism securing the tailgate in the engaged position, the locking mechanism in communication with the motor, wherein activation of the motor disengages the locking mechanism.

9. A powered lift gate apparatus for placement in a truck bed to move the tailgate, the apparatus comprising:
   the tailgate hingedly mounted at an end of the truck bed opposite a cab of the truck in an engaged position, the tailgate having opposed ends in communication with an upper side and a lower side, the opposed ends each including a pair of pins, a pin of the pair of pins located on the upper side and a pin of the pair of pins located on the lower side;
   a pair of motors, each motor of the pair of motors positioned in the truck bed on an interior opposed side adjacent to an upper portion of the truck bed at a central position, wherein the motors are capable of simultaneous rotary motion;
   a pair of sprockets, each of the sprockets of the pair of the sprockets coupled to the motor, the sprockets including a plurality of teeth, the sprockets rotating in cooperation with the motor;
   a pair of chains, each of the chains of the pair of chains in communication with the sprocket and coupled to the pins on the upper side of the tailgate, wherein operation of the motor displaces the chain and moves the tailgate to and from the engaged position; and
   a pair of channels, each channel of the pair of channels being recessed relative to an internal frame of the interior of the truck bed, the channel receiving the chain and the pins and adjacent to the motor, the channel extending a substantial portion of a length of the truck bed, wherein the channel partially conceals the apparatus during use.

10. The powered lift gate apparatus as in claim 9, wherein the motor central position is between the cab of the truck and the tailgate.

11. The powered lift gate apparatus as in claim 9, wherein the apparatus includes a locking mechanism, the locking mechanism securing the tailgate in the engaged position, the locking mechanism in communication with the motor, wherein activation of the motor disengages the locking mechanism.

* * * * *